US011861940B2

(12) United States Patent
Mittal et al.

(10) Patent No.: US 11,861,940 B2
(45) Date of Patent: Jan. 2, 2024

(54) HUMAN EMOTION RECOGNITION IN IMAGES OR VIDEO

(71) Applicant: UNIVERSITY OF MARYLAND, COLLEGE PARK, College Park, MD (US)

(72) Inventors: Trisha Mittal, College Park, MD (US); Aniket Bera, Greenbelt, MD (US); Uttaran Bhattacharya, College Park, MD (US); Rohan Chandra, College Park, MD (US); Pooja Guhan, College Park, MD (US); Dinesh Manocha, Greenbelt, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 70 days.

(21) Appl. No.: 17/349,732

(22) Filed: Jun. 16, 2021

(65) Prior Publication Data
US 2021/0390288 A1 Dec. 16, 2021

Related U.S. Application Data

(60) Provisional application No. 63/039,845, filed on Jun. 16, 2020.

(51) Int. Cl.
*G06K 9/00* (2022.01)
*G06V 40/16* (2022.01)
(Continued)

(52) U.S. Cl.
CPC ........ *G06V 40/174* (2022.01); *G06F 18/2431* (2023.01); *G06F 18/253* (2023.01);
(Continued)

(58) Field of Classification Search
CPC .... G06V 40/174; G06V 10/803; G06V 10/82; G06V 20/35; G06V 40/103; G06V 40/20;
(Continued)

(56) References Cited

U.S. PATENT DOCUMENTS

2020/0349414 A1\* 11/2020 Bazhenov ............. G06F 18/254
2021/0295093 A1\* 9/2021 Pan ........................ G06V 10/00

OTHER PUBLICATIONS

Context-Aware Emotion Recognition Networks Jiyoung Lee1, Seungryong Kim2, Sunok Kim1, Jungin Park1, Kwanghoon Sohn1; 1Yonsei University, 2' Ecole Polytechnique F'ed'erale de Lausanne (EPFL) (Year: 2019).\*

(Continued)

*Primary Examiner* — Dhaval V Patel
(74) *Attorney, Agent, or Firm* — SQUIRE PATTON BOGGS (US) LLP

(57) ABSTRACT

Systems, methods, apparatuses, and computer program products for recognizing human emotion in images or video. A method for recognizing perceived human emotion may include receiving a raw input. The raw input may be processed to generate input data corresponding to at least one context. Features from the raw input data may be extracted to obtain a plurality of feature vectors and inputs. The plurality of feature vectors and the inputs may be transmitted to a respective neural network. At least some of the plurality of feature vectors may be fused to obtain a feature encoding. Additional feature encodings may be computed from the plurality of feature vectors via the respective neural network. A multi-label emotion classification of a primary agent may be performed in the raw input based on the feature encoding and the additional feature encodings.

21 Claims, 14 Drawing Sheets

(51) Int. Cl.
| | |
|---|---|
| G06N 3/04 | (2023.01) |
| G06V 40/20 | (2022.01) |
| G06F 18/25 | (2023.01) |
| G06F 18/2431 | (2023.01) |
| G06V 10/80 | (2022.01) |
| G06V 10/82 | (2022.01) |
| G06V 20/00 | (2022.01) |
| G06V 40/10 | (2022.01) |

(52) U.S. Cl.
CPC ............. *G06N 3/04* (2013.01); *G06V 10/803* (2022.01); *G06V 10/82* (2022.01); *G06V 20/35* (2022.01); *G06V 40/103* (2022.01); *G06V 40/20* (2022.01)

(58) Field of Classification Search
CPC ..... G06F 18/2431; G06F 18/253; G06N 3/04; G06N 3/045; G06N 3/048; G06N 3/084
See application file for complete search history.

(56) References Cited

OTHER PUBLICATIONS

A. Dhall et al., "Collecting Large, Richly Annotated Facial-Expression Databases from Movies", Journal of Latex Class Files, vol. 6, No. 1, Jan. 2007, 14 pages, Sep. 13, 2012.

Kingsley Oryina Akputu et al., "Facial Emotion Recognition for Intelligent Tutoring Environment", 2nd International Conference on Machine Learning, and Computer Science (IMLCS'2013) May 6-7, 2013, Kuala Lumpur (Malaysia), 5 pages.

Amelia Aldao, "The Future of Emotion Regulation Research: Capturing Context", Association for Psychological Science, Perspectives on Psychological Science 8(2) 155-172, sagepub.com/journalsPermissions.nav, DOI: 10.1177/1745691612459518, http://pps.sagepub.com, 18 pages.

Hillel Aviezer et al., "Body Cues, Not Facial Expressions, Discriminate Between Intense Positive and Negative Emotions", www.sciencemag.org, Science, vol. 338, Nov. 30, 2012, 6 pages.

Tadas Baltrusaitis et al., "OpenFace: an open source facial behavior analysis toolkit", https://www.cl.cam.ac.uk/research/rainbow/projects/openface/, 10 pages.

Lisa Feldman Barrett et al., "Context in Emotion Perception", Association for Psychological Science, Current Directions in Psychological Science 20(5) 286-290, sagepub.com/journalsPermissions.nav, DOI: 10.1177/0963721411422522, http://cdps.sagepub.com, 5 pages.

Mikhail Belkin et al., "Laplacian Eigenmaps for Dimensionality Reduction and Data Representation", Neural Computation 15, 1373-1396 (2003), 24 pages.

C. Fabian Benitez-Quiroz et al., "EmotioNet: An accurate, real-time algorithm for the automatic annotation of a million facial expressions in the wild", provided by the Computer Vision Foundation, identical to the version available on IEEE Xplore, 9 pages.

Uttaran Bhattacharya et al., "STEP: Spatial Temporal Graph Convolutional Networks for Emotion Perception from Gaits", The Thirty-Fourth AAAI Conference on Artificial Intelligence (AAAI-20), 9 pages.

Carlos Busso et al., "IEMOCAP: Interactive emotional dyadic motion capture database", Oct. 15, 2007, LRE_2008.tex, Nov. 9, 2008, 30 pages.

Zhe Cao et al., "Realtime Multi-Person 2D Pose Estimation using Part Affinity Fields", Open Access Version, provided by Computer Vision Foundation, identical to the version available on IEEE Xplore.

Rohan Chandra et al., "RobustTP: End-to-End Trajectory Prediction for Heterogeneous Road-Agents in Dense Traffic with Noisy Sensor Inputs", Oct. 8, 2019, Kaiserslautern, Germany, 2019 Association for Computing Machinery, https://doi.org/10.1145/3359999.3360495, 9 pages.

C. Clavel et al, "Fear-type emotion recognition for future audio-based surveillance systems", Speech Communication 50 (2008) 487-503, www.elsevier.com/locate/specom, www.sciencedirect.com, doi:10.1016/j.specom.2008.03.012, 18 pages.

Jeffrey F. Cohn, "Face Alignment through Subspace Constrained Mean-Shifts", Proceedings of the IEEE International Conference on Computer Vision, 9 pages.

Bin-Bin Chen et al., "Automatic differentiation for second renormalization of tensor networks", Physical Review B 101, 220409(R) (2020), Rapid Communications, DOI:10.1103/PhysRevB.101.220409, 2020 American Physical Society, 6 pages.

R. Cowie et al., "Emotion Recognition in Human-Computer Interaction", IEEE Signal Processing Magazine, Jan. 2001, 49 pages.

Abhinav Dhall et al., "EmotiW 2016: Video and Group-Level Emotion Recognition Challenges", ICMI 16, Nov. 12-16, 2016, Tokyo, Japan, http://dx.doi.org/10.1145/2993148.2997638, 6 pages.

Paul Ekman et al., "Head and Body Cues in the Judgment of Emotion: A Reformulation", Perceptual and Motor Skills, 1967, 24, 711-724, 14 pages.

Hiroshi Fukui et al., "Attention Branch Network: Learning of Attention Mechanism for Visual Explanation", Chubu University, Aichi, Japan, this is the Open Access version, final published version is available on IEEE Xplore, 10 pages.

Samanyou Garg, "Group Emotion Recognition Using Machine Learning", Third Year Project Report, Manchester 1824, The University of Manchester, Submitted Apr. 2019, 52 pages.

Hatice Gunes et al., "Bi-modal Emotion Recognition from Expressive Face and Body Gestures", Computer Vision Research Group, University of Technology, Sydney, Australia, 12 pages.

Shengnan Guo et al., "Attention Based Spatial-Temporal Graph Convolutional Networks for Traffic Flow Forecasting", The thirty-Third AAAI Conference on Artificial Intelligence (AAAI-19), Beijing, China, www.aaai.org, 8 pages.

Dirk Helbing et al., "Social Force Model for Pedestrian Dynamics", Physical Review E, vol. 51, No. 5, May 1995, University of Stuttgart, Stuttgart, Germany, The American Physical Society, 5 pages.

Esther Jakobs et al., "Social Context Effects on Facial Activity in a Negative Emotional Setting", University of Amsterdam, Emotion 2001, vol. 1, No. 1, 51-69, American Psychological Association, Inc., 19 pages, DOI:10.1037//1528-3542.1.1.51.

Andrea Kleinsmith et al., "Affective Body Expression Perception and Recognition: A Survey", IEEE Transactions on Journal Name, Manuscript ID, 20 pages.

R. Benjamin Knapp et al., "Physiological Signals and Their Use in Augmenting Emotion Recognition for Human-Machine Interaction", Queen's University Belfast, Belfast, Northern Ireland, UK, 27 pages.

Ronak Kosti et al., "Context Based Emotion Recognition Using EMOTIC Dataset", IEEE Transactions on Pattern Analysis and Machine Intelligence, http://sunai.uoc.edu.emotic/, 12 pages.

Alison Ledgerwood, "Evaluations in Their Social Context: Distance Regulates Consistency and Context Dependence", Social and Personality Psychology Compass 8/8 (2014): 436-447, 10.1111/spc3.12123, University of California, Davis, 12 pages.

Tsung-Yi Lin et al., "Microsoft COCO: Common Objects in Context", 15 pages.

Kuan Liu et al., "Learn to Combine Modalities in Multimodal Deep Learning", University of Southern California, Venice, California, May 29, 2018, 15 pages.

Aleix M. Martinez, "Context may reveal how you feel", Commentary, The Ohio State University, Center for Cognitive and Brain Sciences, Columbus, OH, www.pnas.org/cgi.doi/10.1073/pnas.1902661116, PNAS, Apr. 9, 2019, vol. 116, No. 15, 7169-7171, 3 pages.

James K. McNulty et al., "Beyond Positive Psychology?, Toward a Contextual View of Psychological Processes and Well-Being", American Psychological Association, vol. 67, No. 2, 101-110, DOI: 10.1037/a0024572, 10 pages.

Hanneke K. M. Meeren et al., "Rapid perceptual integration of facial expression and emotional body language", PNAS, Nov. 8, 2005, vol. 102, No. 45, 16518-16523, 6 pages, www.pnas.org/cgi.doi/10.1073/pnas.0507650102.

(56) References Cited

OTHER PUBLICATIONS

Batja Mesquita et al., "Emotions in Context: A Sociodynamic Model of Emotions", Emotion Review vol. 6, No. 4 (Oct. 2014), 298-302, DOI:10.1177/1754073914534480, er.sagepub.com, 5 pages.

Trisha Mittal et al., "M3ER: Multiplicative Multimodal Emotion Recognition Using Facial, Textual, and Speech Cues", The Thirty-Fourth AAAI Conference on Artificial Intelligence (AAAI-20), University of Maryland, College Park, Project URL: https://gamma.umd.edu/m3er, 9 pages.

Ronak Kosti et al., "Emotion Recognition in Context", Open Access Version, it is identical to the version available on IEEE Xplore, 9 pages.

Tanmay Randhavane et al., "Identifying Emotions from Walking Using Affective and Deep Features", Jan. 9, 2020, 15 pages.

Michael David Resnik, "The Context Principle in Frege's Philosophy", Philosophy and Phenomenological Research, Mar. 1967, vol. 27, No. 3, paged 356-365, International Phenomenological Society, URL: https://www.jstor.org/stable/2106062, 11 pages.

Shan Li et al., "Reliable Crowdsourcing and Deep Locality-Preserving Learning for Expression Recognition in the Wild", Open Access Version is identical to the version available on IEEE Xplore, Beijing University of Posts and Telecommunications, 10 pages.

Caifeng Shan et al., "Facial Expression Recognition Based on Local Binary Patterns: A Comprehensive Study", Image and Vision Computing 27 (2009) 803-816, www.elsevier.com/locate/imavis, doi:10.1016/j.imavis.2008.08.005, 14 pages.

Karan Sikka et al., "Multiple Kernel Learning for Emotion Recognition in the Wild", Machine Perception Laboratory, La Jolla, CA, 8 pages.

Jessica L. Tracy et al., "Development of a FACS-Verified Set of Basic and Self-Conscious Emotion Expressions", Emotion 2009, vol. 9, No. 4, 554-559, 2009 American Psychological Association, DOI: 10.1037/a0015766, 6 pages.

Kai Wang et al., "Cascade Attention Networks for Group Emotion Recognition with Face, Body and Image Cues", EmotiW Grand Challenge, ICMI'18, Oct. 16-20, 2018, Boulder, CO, 2018 Association for Computing Machinery, https://doi.org/10.1145/3242969.3264991, 6 pages.

Sijie Yan et al., "Spatial Temporal Graph Convolutional Networks for Skeleton-Based Action Recognition", The Thirty-Second AAAI Conference on Artificial Intelligence (AAAI-18), The Chinese University of Hong Kong, 2018 Association for the Advancement of Artificial Intelligence (www.aaai.org), 9 pages.

H. Yeh et al., "Composite Agents", Eurographics/ACM SIGGRAPH Symposium on Computer Animation (2008) University of North Carolina at Chapel Hill, NC, http://gamma.cs.unc.edu/CompAgent, 9 pages.

Zhengqi Li et al., "MegaDepth: Learning Single-View Depth Prediction from Internet Photos", this is the Open Access Version it is identical to the version available on IEEE Xplore, Cornell University, http://www.cs.cornell.edu/projects/megadepth/, 10 pages.

Amir Zadeh et al., "Multimodal Language Analysis in the Wild: CMU-MOSEI Dataset and Interpretable Dynamic Fusion Graph", CMU, USA, Nanyang Technological University, Singapore, 11 pages.

Jian Zheng et al., "Image Captioning with Integrated Bottom-Up and Multi-level Residual Top-Down Attention for Game Scene Understanding", State University of New York at Binghamton, sony Interactive Entertainment LLC, and Georgia Institute of Technology, Jun. 16, 2019, 4 pages.

Lin Zhong et al., "Learning Active Facial Patches for Expression Analysis", Rutgers University, Piscataway, NJ, Nanjing University of Information Science and Technology, Nanjing, China, and University of Texas at Arlington, Arlington, TX, 8 pages.

Bolei Zhou et al., "Semantic Understanding of Scenes through the ADE20K Dataset", ResearchGate, International Journal of Computer Vision, Mar. 2019, DOI: 10.1007/s11263-018-1140-0, https://www.researchgate.net/publication/306357649, Massachusetts Institute of Technology, and University of Toronto, Canada, 13 pages.

\* cited by examiner

| Data type | Dataset | Dataset Size | Agents Annotated | Setting | Emotion Labels | Context |
|---|---|---|---|---|---|---|
| Images | EMOTIC | 18,316 images | 34,320 | Web | 26 Categories | Yes |
| | AffectNet | 450,000 images | 450,000 | Web | 8 Categories | No |
| | CAER-S | 70,000 images | 70,000 | TV Shows | 7 Categories | Yes |
| Videos | AFEW | 1,809 clips | 1,809 | Movie | 7 Categories | No |
| | CAER | 13,201 clips | 13,201 | TV Show | 7 Categories | Yes |
| | IEMOCAP | 12 hrs | - | TV Show | 4 Categories | Yes |
| | GroupWalk | 45 clips(10 mins each) | 3544 | Real Settings | 4 Categories | Yes |

FIG. 2

| Labels | Kosti et al. | Zhang et al. | Lee et al. | EmotiCon | |
|---|---|---|---|---|---|
| | | | | GCN-Based | Depth-Based |
| Affeciton | 27.85 | 46.89 | 19.9 | 36.78 | 45.23 |
| Anger | 09.49 | 10.87 | 11.5 | 14.92 | 15.46 |
| Annoyance | 14.06 | 11.23 | 16.4 | 18.45 | 21.92 |
| Anticipation | 58.64 | 62.64 | 53.05 | 68.12 | 72.12 |
| Aversion | 07.48 | 5.93 | 16.2 | 16.48 | 17.81 |
| Confidence | 78.35 | 72.49 | 32.34 | 59.23 | 68.65 |
| Disapproval | 14.97 | 11.28 | 16.04 | 21.21 | 19.82 |
| Disconnection | 21.32 | 26.91 | 22.80 | 25.17 | 43.12 |
| Disquietment | 16.89 | 16.94 | 17.19 | 16.41 | 18.73 |
| Doubt/Confusion | 29.63 | 18.68 | 28.98 | 33.15 | 35.12 |
| Embarrassment | 03.18 | 1.94 | 15.68 | 11.25 | 14.37 |
| Engagement | 87.53 | 88.56 | 46.58 | 90.45 | 91.12 |
| Esteem | 17.73 | 13.33 | 19.26 | 22.23 | 23.62 |
| Excitement | 77.16 | 71.89 | 35.26 | 82.21 | 83.26 |
| Fatigue | 09.70 | 13.26 | 13.04 | 19.15 | 16.23 |
| Fear | 14.14 | 4.21 | 10.41 | 11.32 | 23.65 |
| Happiness | 58.26 | 73.26 | 49.36 | 68.21 | 74.71 |
| Pain | 08.94 | 6.52 | 10.36 | 12.54 | 13.21 |
| Peace | 21.56 | 32.85 | 16.72 | 35.14 | 34.27 |
| Pleasure | 45.46 | 57.46 | 19.47 | 61.34 | 65.53 |
| Sadness | 19.66 | 25.42 | 11.45 | 26.15 | 23.41 |
| Sensitivity | 09.28 | 5.99 | 10.34 | 9.21 | 8.32 |
| Suffering | 18.84 | 23.39 | 11.68 | 22.81 | 26.39 |
| Surprise | 18.81 | 9.02 | 10.92 | 14.21 | 17.37 |
| Sympathy | 14.71 | 17.53 | 17.125 | 24.63 | 34.28 |
| Yearning | 08.35 | 10.55 | 9.79 | 12.23 | 14.29 |
| mAP | 27.38 | 28.42 | 20.84 | 32.03 | 35.48 |

FIG. 4(a)

| Labels | Kosti et al. | Zhang et al. | Lee et al. | EmotiCon | |
|---|---|---|---|---|---|
| | | | | GCN-Based | Depth-Based |
| Anger | 58.46 | - | 42.31 | 65.13 | 69.42 |
| Happy | 69.12 | - | 56.79 | 72.46 | 73.18 |
| Neutral | 42.27 | - | 39.24 | 44.51 | 48.51 |
| Sad | 63.83 | - | 54.33 | 68.25 | 72.24 |
| mAP | 58.42 | - | 48.21 | 62.58 | 65.83 |

FIG. 4(b)

| Ground Truth | Input Image | Predicted |
|---|---|---|
| Annoyance<br>Anger<br>Esteem |  | Sympathy<br>Yearning<br>Disapproval |
| Disconnection<br>Fatigue<br>Disapproval | 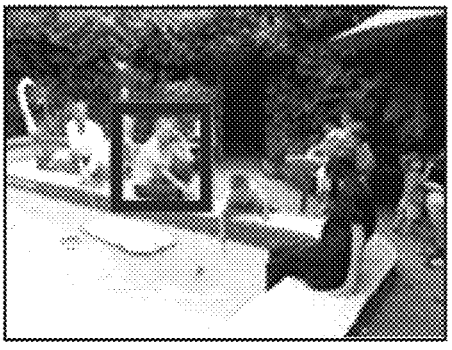 | Happiness<br>Pleasure<br>Excitement |
FIG. 6

| Labels | Context Interpretations | | | |
|---|---|---|---|---|
| | Only 1 | Only 1 and 2 | Only 1 and 3 | 1, 2 and 3 |
| Affeciton | 29.87 | 41.83 | 30.15 | 45.23 |
| Anger | 08.52 | 11.41 | 8.36 | 15.46 |
| Annoyance | 09.65 | 17.37 | 12.91 | 21.92 |
| Anticipation | 46.23 | 67.59 | 60.53 | 72.12 |
| Aversion | 06.27 | 11.71 | 09.46 | 17.81 |
| Confidence | 51.92 | 65.27 | 59.63 | 68.85 |
| Disapproval | 11.81 | 17.35 | 15.41 | 19.82 |
| Disconnection | 31.74 | 41.46 | 32.56 | 43.12 |
| Disquietment | 07.57 | 12.69 | 12.24 | 18.73 |
| Doubt/Confusion | 21.62 | 31.28 | 29.51 | 35.12 |
| Embarrassment | 08.43 | 10.51 | 12.25 | 14.37 |
| Engagement | 78.68 | 84.62 | 81.51 | 91.12 |
| Esteem | 18.32 | 18.79 | 09.42 | 23.62 |
| Excitement | 73.19 | 80.54 | 76.14 | 83.26 |
| Fatigue | 06.34 | 11.95 | 14.15 | 16.23 |
| Fear | 14.29 | 21.36 | 22.29 | 23.65 |
| Happiness | 52.52 | 69.51 | 71.51 | 74.71 |
| Pain | 05.75 | 09.56 | 11.10 | 13.21 |
| Peace | 13.53 | 30.72 | 30.15 | 34.27 |
| Pleasure | 58.26 | 61.89 | 59.81 | 65.53 |
| Sadness | 19.94 | 19.74 | 22.27 | 23.41 |
| Sensitivity | 03.16 | 04.11 | 8.15 | 8.32 |
| Suffering | 15.38 | 20.92 | 12.83 | 26.39 |
| Surprise | 05.29 | 16.45 | 16.26 | 17.37 |
| Sympathy | 22.38 | 30.68 | 22.17 | 34.28 |
| Yearning | 04.94 | 10.53 | 9.82 | 14.29 |
| mAP | 24.06 | 31.53 | 29.63 | 35.48 |

FIG. 7(a)

| Labels | Context Interpretations | | | |
|---|---|---|---|---|
| | Only 1 | Only 1 and 2 | Only 1 and 3 | 1, 2 and 3 |
| Anger | 58.51 | 63.83 | 66.15 | 69.42 |
| Happy | 61.24 | 64.16 | 68.87 | 73.18 |
| Neutral | 40.36 | 41.57 | 44.15 | 48.51 |
| Sad | 62.17 | 67.22 | 70.35 | 72.24 |
| mAP | 55.57 | 59.20 | 62.38 | 65.83 |

FIG. 7(b)

| Labels | Kosti et al. | Zhang et al. | Lee et al. | EmotiCon | |
|---|---|---|---|---|---|
| | | | | GCN-Based | Depth-Based |
| Anger | 80.7% | - | 77.3% | 87.2% | 88.2% |
| Happy | 78.9% | - | 72.4% | 82.4% | 83.4% |
| Neutral | 73.5% | - | 62.8% | 75.5% | 77.5% |
| Sad | 81.3% | - | 68.7% | 88.2% | 88.9% |
| mAP | 78.6% | | 70.3% | 83.4% | 84.5% |

FIG. 12

HUMAN EMOTION RECOGNITION IN IMAGES OR VIDEO

CROSS-REFERENCE TO RELATED APPLICATIONS

This application claims priority from U.S. provisional patent application No. 63/039,845 filed on Jun. 16, 2020. The contents of this earlier filed application are hereby incorporated by reference in their entirety.

STATEMENT REGARDING FEDERALLY SPONSORED RESEARCH

This invention was made with government support under W911NF1910069 and W911NF1910315 awarded by the Army Research Office. The government has certain rights in the invention.

FIELD

Some embodiments may generally relate to recognizing human emotion. For example, certain example embodiments may relate to apparatuses, systems, and/or methods for recognizing human emotion in images or video.

BACKGROUND

Perceiving the emotions of people around us may be vital in everyday life. Humans may often alter their behavior while interacting with others based on their perceived emotions. In particular, automatic emotion recognition has been used for different applications, including human-computer interaction, surveillance, robotics, games, entertainment, and more. Emotions may be modeled as discrete categories or as points in a continuous space of affective dimensions. In the continuous space, emotions may be treated as points in a 3D space of valence, arousal, and dominance. Thus, there is a need to focus on recognizing perceived human emotion rather than the actual emotional state of a person in the discrete emotion space.

SUMMARY

Some example embodiments may be directed to a method. The method may include receiving a raw input. The method may also include processing the raw input to generate input data corresponding to at least one context. The method may further include extracting features from the raw input data to obtain a plurality of feature vectors and inputs. In addition, the method may include transmitting the plurality of feature vectors and the inputs to a respective neural network. Further, the method may include fusing at least some of the plurality of feature vectors to obtain a feature encoding. The method may also include computing additional feature encodings from the plurality of feature vectors via the respective neural network. The method may further include performing a multi-label emotion classification of a primary agent in the raw input based on the feature encoding and the additional feature encodings.

Other example embodiments may be directed to an apparatus. The apparatus may include at least one processor and at least one memory including computer program code. The at least one memory and computer program code may be configured to, with the at least one processor, cause the apparatus at least to receive a raw input. The apparatus may also be caused to process the raw input to generate input data corresponding to at least one context. The apparatus may further be caused to extract features from the raw input data to obtain a plurality of feature vectors and inputs. In addition, the apparatus may be caused to transmit the plurality of feature vectors and the inputs to a respective neural network. Further, the apparatus may be caused to fuse at least some of the plurality of feature vectors to obtain a feature encoding. The apparatus may also be caused to compute additional feature encodings from the plurality of feature vectors via the respective neural network. The apparatus may further be caused to perform a multi-label emotion classification based on the feature encoding and the additional feature encodings.

Other example embodiments may be directed to an apparatus. The apparatus may include means for receiving a raw input. The apparatus may also include means for processing the raw input to generate input data corresponding to at least one context. The apparatus may further include means for extracting features from the raw input data to obtain a plurality of feature vectors and inputs. In addition, the apparatus may include means for transmitting the plurality of feature vectors and the inputs to a respective neural network. Further, the apparatus may include means for fusing at least some of the plurality of feature vectors to obtain a feature encoding. The apparatus may also include means for computing additional feature encodings from the plurality of feature vectors via the respective neural network. The apparatus may further include means for performing a multi-label emotion classification of a primary agent in the raw input based on the feature encoding and the additional feature encodings.

In accordance with other example embodiments, a non-transitory computer readable medium may be encoded with instructions that may, when executed in hardware, perform a method. The method may include receiving a raw input. The method may also include processing the raw input to generate input data corresponding to at least one context. The method may further include extracting features from the raw input data to obtain a plurality of feature vectors and inputs. In addition, the method may include transmitting the plurality of feature vectors and the inputs to a respective neural network. Further, the method may include fusing at least some of the plurality of feature vectors to obtain a feature encoding. The method may also include computing additional feature encodings from the plurality of feature vectors via the respective neural network. The method may further include performing a multi-label emotion classification of a primary agent in the raw input based on the feature encoding and the additional feature encodings.

Other example embodiments may be directed to a computer program product that performs a method. The method may include receiving a raw input. The method may also include processing the raw input to generate input data corresponding to at least one context. The method may further include extracting features from the raw input data to obtain a plurality of feature vectors and inputs. In addition, the method may include transmitting the plurality of feature vectors and the inputs to a respective neural network. Further, the method may include fusing at least some of the plurality of feature vectors to obtain a feature encoding. The method may also include computing additional feature encodings from the plurality of feature vectors via the respective neural network. The method may further include performing a multi-label emotion classification of a primary agent in the raw input based on the feature encoding and the additional feature encodings.

BRIEF DESCRIPTION OF THE DRAWINGS

For proper understanding of example embodiments, reference should be made to the accompanying drawings, wherein:

FIG. 2 illustrates an example context-aware emotion recognition dataset analysis, according to certain embodiments.

FIG. 4(a) illustrates a table of emotion classification performance of average precision (AP) scores for the EMOTIC dataset, according to certain embodiments.

FIG. 4(b) illustrates a table of emotion classification performance of AP scores for the GroupWalk dataset, according to certain embodiments.

FIG. 6 illustrates misclassification by the context-aware emotion recognition model, according to certain embodiments.

FIG. 7(a) illustrates a table of ablation experiments on the EMOTIC dataset, according to certain embodiments.

FIG. 7(b) illustrates a table of ablation experiments on the GroupWalk dataset, according to certain embodiments.

FIG. 12 illustrates a table of interactive emotional dyadic motion capture (IEMOCAP) experiments, according to certain embodiments.

DETAILED DESCRIPTION

Figure 1:
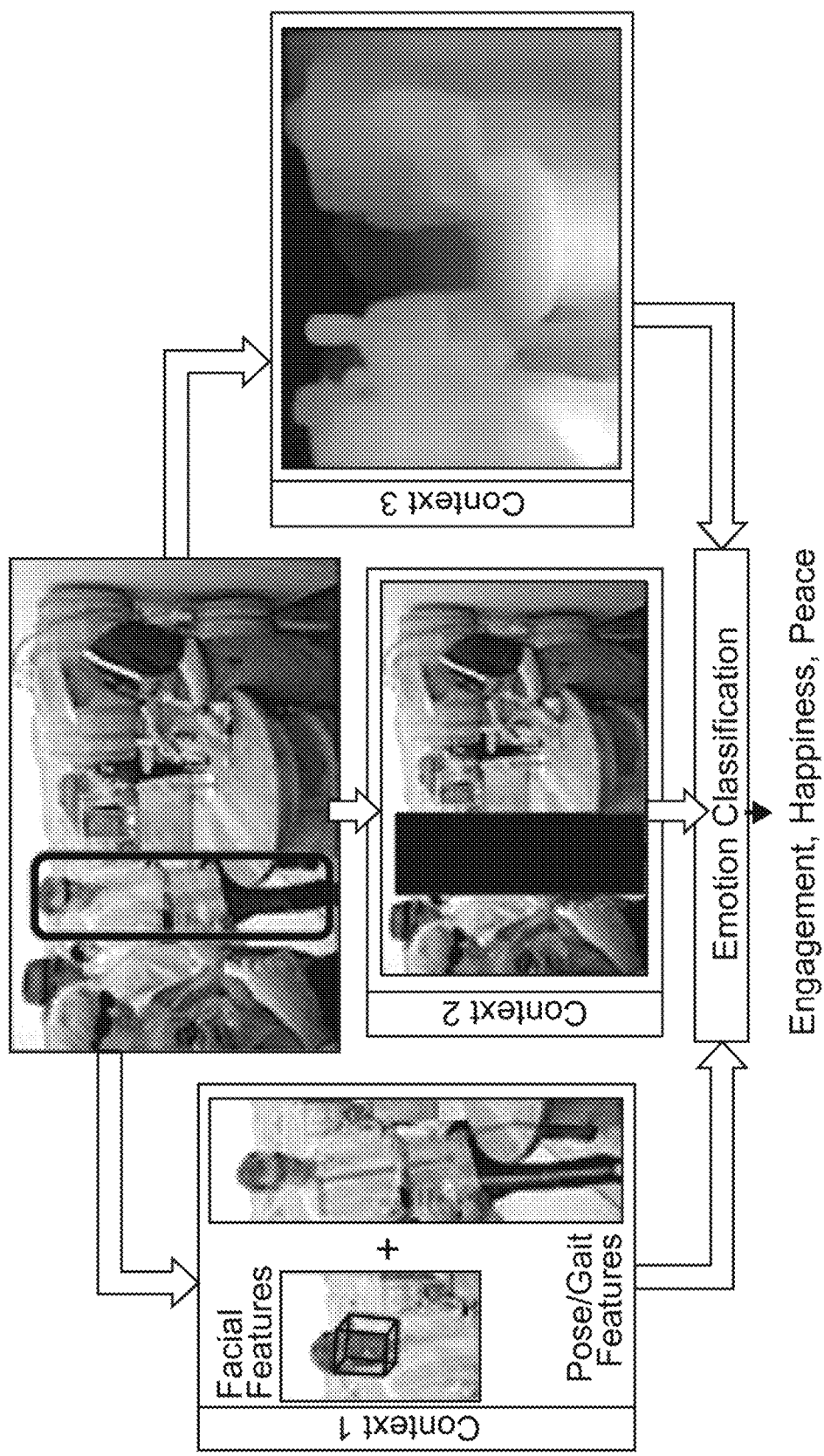
FIG. 1 illustrates an example context-aware multimodal emotion recognition model based on input samples from an Emoticons in Context (EMOTIC) dataset, according to certain embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for recognizing human emotion in images or video.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain embodiments, and not in limitation thereof.

Certain works in emotion recognizing focus on unimodal approaches. The unique modality may correspond to facial expressions, voice, text, body posture, gaits, or physiological signals. This may be followed by multimodal emotion recognition, where various combinations of modalities may be used and combined in various manners to infer emotions. Although such modalities or cues extracted from a person may provide information regarding the perceived emotion, context may also play a role in the understanding of the perceived emotion.

The term "context" may be of interest in multiple ways. For instance, in certain embodiments, context 1 may correspond to multiple modalities. In this context, cues from different modalities may be incorporated. This domain may also be known as multi-modal emotion recognition, in which multiple modalities may be combined to provide complementary information, which may lead to better inference and also perform better on in-the-wild datasets.

In other embodiments, context 2 may correspond to background context. In this context, semantic understanding of the scene from visual cues in the image may help in obtaining insights about an agent's (e.g., person) surroundings and activity, both of which may affect the perceived emotional state of the agent.

In further embodiments, context 3 may correspond to socio-dynamic inter-agent interactions. In this context, the presence or absence of other agents may affect the perceived emotional state of an agent. When other agents share an identity or are known to the agent, they may coordinate their behaviors. This may vary when other agents are strangers. Such interactions and proximity to other agents may have been less explored for perceived emotion recognition.

FIG. 1 illustrates an example context-aware multimodal emotion recognition model based on input samples from an Emoticons in Context (EMOTIC) dataset, according to certain embodiments. As illustrated in the example of FIG. 1, certain embodiments may include implementations of context to perform perceived emotion recognition. For example, multiple modalities (e.g., context 1) of faces and gaits may be used. In addition, background visual information (e.g., context 2), and socio-dynamic inter-agent interactions (e.g., context 3) may be used to infer the perceived emotion.

As discussed herein, certain embodiments may make emotion recognition systems work for real-life scenarios. This may imply using modalities that do not require sophisticated equipment to be captured, and are readily available. Experiments have been conducted by mixing faces and body features corresponding to different emotions, which have found that participants guessed the emotions that matched the body features. This is also because of the ease of "mocking" one's facial expressions. Subsequently, it has been found that the combination of faces and body features may be reliable measures of inferring human emotion. As a result, it may be useful to combine such face and body features for context-based emotion recognition.

As described herein, certain embodiments may provide a context-aware emotion recognition model. According to certain embodiments, the input to the model may include images or video frames, and the output may be a multi-label emotion classification. In certain embodiments, a context-aware multimodal emotion recognition method may be presented. For instance, certain embodiments may incorporate three interpretations of context to perform emotion recognition from videos and images. Other embodiments may provide an approach to modeling the socio-dynamic interactions between agents using a depth-based convolutional neural network (CNN). In addition, a depth map of the image may be computed and fed to a network to learn about the proximity of agents to each other. In other embodiments, a GroupWalk dataset for emotion recognition may be provided. To enable research in this domain, certain embodiments may make GroupWalk publicly available with emotion annotations. The GroupWalk dataset may include a collection of 45 videos captured in multiple real-world settings of people walking in dense crowd settings. The videos may have about 3,544 agents annotated with their emotion labels.

Certain embodiments may be compared with prior methods by testing performance on EMOTIC, a benchmark dataset for context-aware emotion recognition. In particular, certain embodiments may generate a report of an improved average precision (AP) score of 35.48 on the EMTIC dataset, which is an improvement of 7-8 over prior methods. AP scores of the emotion recognition model of certain embodiments may also be reported compared to prior methods on the new dataset, GroupWalk. As discussed herein, ablation experiments may be performed on both datasets, to justify the need for the three components of the emotion recognition model. In addition, as per the annotations provided in EMOTIC, a multi-label classification over 26 discrete emotion labels were performed, and multi-label classification over 4 discrete emotions (e.g., anger, happy, neutral, and sad) were performed on GroupWalk.

Prior works in emotion recognition from handcrafted features or deep learning networks have used single modalities such as facial expression, voice, and speech expressions, body gestures, gaits, and physiological signals such as respiratory and heart cues. However, there has been a shift in the paradigm, where it has been attempted to fuse multiple modalities to perform emotion recognition (i.e., multimodal emotion recognition). Fusion methods such as early fusion, late fusion, and hybrid fusion have been explored for emotion recognition from multiple modalities.

Researchers in psychology have agreed that similar to most psychological processes, emotional processes cannot be interpreted without context. It has been suggested that context may produce emotion and also shape how emotion is perceived. In addition, contextual features have been organized into three levels including, for example, micro-level (person) to macro-level (cultural). In level 2 (situational), the contextual features may include factors such as the presence and closeness of other agents. Research has shown that the simple presence of another person may elicit more expression of emotion than situations where people are alone. Thus, these expressions may be more amplified when people know each other, and are not strangers.

As previously mentioned, emotion recognition datasets in the past have focused on a single modality (e.g., faces or body features), or have been collected in controlled settings. For example, the GENKI database and the University of California Davis set of emotion expressions (UCDSEE) dataset are datasets that focus primarily on the facial expressions collected in lab settings. The emotion recognition in the wild (EmotiW) challenges host three databases including acted facial expressions in the wild (AFEW) dataset (collected from TV shows and movies), static facial expressions in the wild (SFEW) (a subset of AFEW with only face frames annotated), and happy people images (HAPPEI) database, which focuses on the problem of group-level emotion estimation. The potential of using context for emotion recognition has been realized, and the lack of such datasets has been highlighted. Context-aware emotion recognition (CAER) dataset is a collection of video-clips from TV shows with 7 discrete emotion annotations. EMOTIC dataset is a collection of images from datasets such as Microsoft common objects in context (MSCOCO) and ADE20K along with images downloaded from web searches. The EMOTIC dataset is a collection of 23,571 images, with about 34,320 people annotated for 26 discrete emotion classes. The various datasets described above are summarized and compared in Table 1 illustrated in FIG. 2. In particular, FIG. 2 illustrates an example context-aware emotion recognition dataset analysis, according to certain embodiments. As illustrated in FIG. 2, there is a comparison of GroupWalk with existing emotion recognition datasets such as EMOTIC, AffectNet, CAER and CAER-S, and AFEW.

Figure 3:
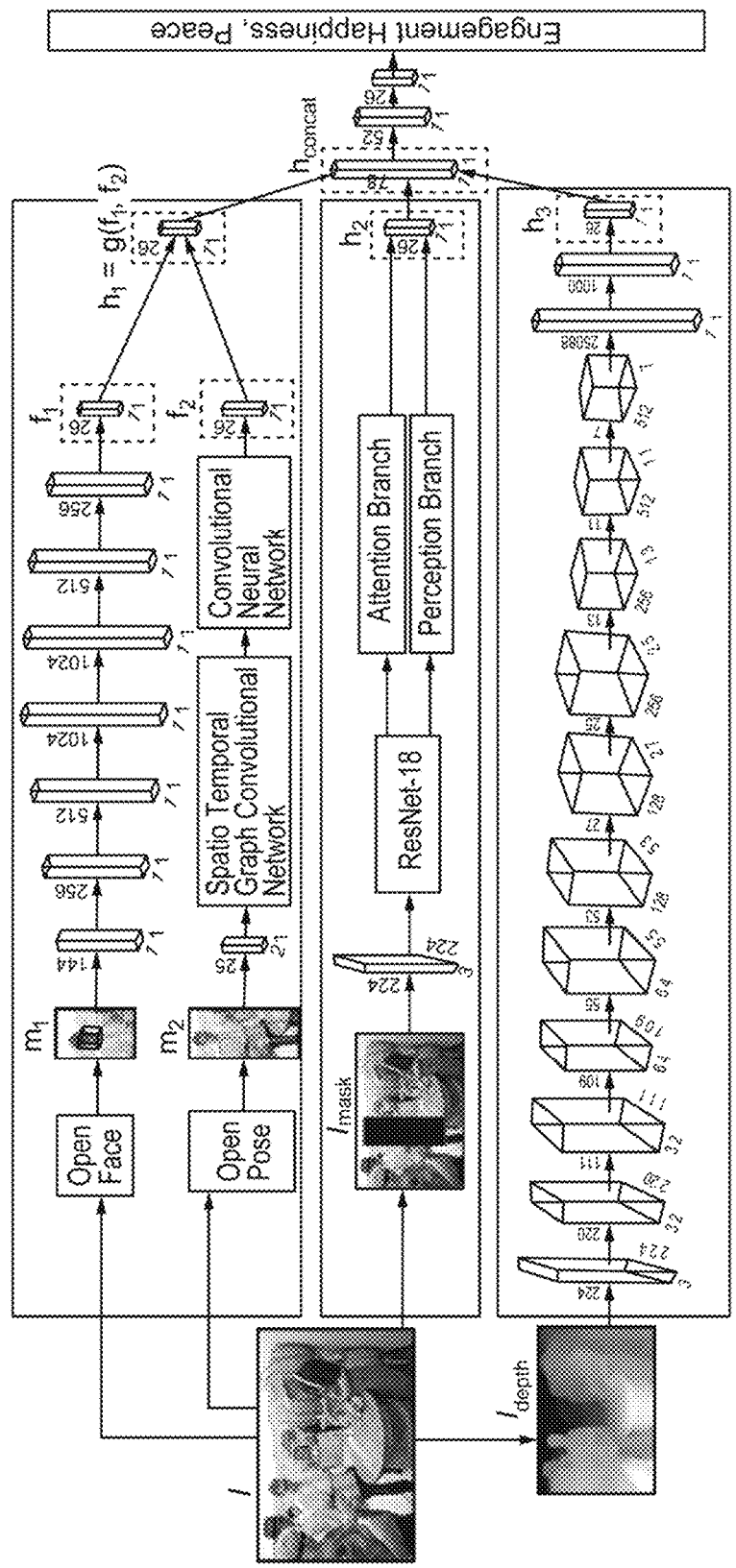
FIG. 3 illustrates an example of a context-aware multimodal emotion recognition model, according to certain embodiments.

FIG. 3 illustrates an example of a context-aware multimodal emotion recognition model, according to certain embodiments. In particular, FIG. 3 illustrates three interpretations of context. For example, features for two modalities may be extracted to obtain $f_1$ and $f_2$, and inputs $I_{mask}$ and $I_{depth}$ from the raw input image, I. These may then be passed through the respective neural networks to obtain $h_1$, $h_2$, and $h_3$. According to certain embodiments, to obtain $h_1$, a multiplicative fusion layer may be used to fuse inputs from both modalities, faces, and gaits. $h_1$, $h_2$, and $h_3$ may then be concatenated to obtain $h_{concat}$.

As illustrated in FIG. 3, the input may include an RGB image, I, or video. According to certain embodiments, the image I may be processed to generate the input data for each network corresponding to the three contexts. The network for context 1 may include n streams corresponding to n distinct modalities denoted as $m_1, m_2, \ldots, m_n$. Each distinct layer may output a feature vector, $f_i$. In addition, the n feature vectors $f_1, f_2, \ldots, f_n$ may be combined via multiplicative fusion to obtain a feature encoding, $h_1 = g(f_1, f_2, \ldots, f_n)$, where $g(\bullet)$ corresponds to the multiplicative fusion function. Similarly, $h_2$ and $h_3$ may be computed through the networks corresponding to the second and third contexts. According to certain embodiments, $h_1$, $h_2$, and $h_3$ may be concatenated to perform multi-label emotion classification.

In real life, people may appear in a multi-sensory context that includes a voice, a body, and a face; these aspects may also be perceived as a whole. As such, certain embodiments may combine more than one modality to infer emotion. This may be beneficial because cues from different modalities may complement each other. They may also perform better on in-the-wild datasets than other unimodal approaches. Thus, certain embodiments may be extendible to any n umber of modalities available.

To validate this claim, other than EMOTIC and GroupWalk, which may have two modalities, faces, and gaits, certain embodiments may also show results on the interactive emotional dyadic motion capture (IEMOCAP) dataset, which may include face, text, and speech as the three modalities. From the input image I, it may be possible to obtain $m_1, m_2, \ldots, m_n$ using processing steps as described herein. These inputs may then be passed through their respective neural network architectures to obtain $f_1$, $f_2, \ldots, f_n$. According to certain embodiments, these features may be combined multiplicatively to obtain $h_1$ to make the method more robust to sensor noise and averse to noisy signals. In certain embodiments, multiplicative fusion may learn to emphasize reliable modalities and to rely less on other modalities. To train this, certain embodiments may use a modified loss function as defined in equation (1).

$$L_{multiplicative} = -\sum_{i=1}^{n}(p_i^e)^{\frac{\beta}{n-1}}\log p_i^e \qquad (1)$$

where n is the total number of modalities being considered, and $p_i^e$ is the prediction for emotion class, e, given by the network for the $i^{th}$ modality.

Certain embodiments may identify semantic context from images and videos to perform perceived emotion recognition. Semantic context may include the understanding of objects-excluding the primary agent (i.e., the agent or person whose perceived emotion that is to be predicted) present in the scene, their spatial extents, keywords, and the activity being performed. For instance, in FIG. 1, the input image may include a group of people gathered around with drinks on a bright sunny day. The "bright sunny day", "drink glasses", "hats", and "green meadows" may constitute a sematic component, and may affect judgment of one's perceived emotion.

According to certain embodiments, an attention mechanism may be used to train a model to focus on different aspects of an image while masking the primary agent, to extract the semantic components of the scene. The mask, $I_{mask} \in \mathbb{R}^{224 \times 224}$, for an input image I may be given as:

$$I_{mask} = \begin{cases} I(i, j) & \text{if } I(i, j) \notin bbox_{agent}, \\ 0 & \text{otherwise.} \end{cases} \qquad (2)$$

where $bbox_{agent}$ denotes the bounding box of the agent in the scene.

In certain embodiments, when an agent is surrounded by other agents, their perceived emotions may change. Further, when other agents share an identity or are known to the agent, they may coordinate their behaviors. This may vary when other agents are strangers. Such interactions and proximity may help better infer the emotion of agents.

Certain experimental research may use walking speed, distance, and proximity features to model socio-dynamic interactions between agents to interpret their personality traits. Some of these algorithms, such as a social force model, may be based on the assumption that pedestrians are subject to attractive or repulsive forces that drive their dynamics. Non-linear models such as reciprocal velocity obstacles (RVO) may model collision avoidance among individuals while walking to their individual goals. However, both of these methods do not capture cohesiveness in a group.

As such, certain embodiments may provide an approach to model socio-dynamic interactions by computing proximity features using depth maps. For example, in certain embodiments, the depth map, $I_{depth} \in \mathbb{R}^{224 \times 224}$, corresponding to input image, I, may be represented through a 2D matrix where, $$I_{depth}(i,j)=d(I(i,j),c) \qquad (3)$$

d(I(i,j), c) represents the distance of the pixel at the $i^{th}$ row and $j^{th}$ column from the camera center, c. Additionally, $I_{depth}$ may be passed as input depth maps through a CNN and obtain $h_3$.

According to certain embodiments, in addition to depth map-based representation, graph convolutional networks (GCNs) may be used to model the proximity-based socio-dynamic interactions between agents. For example, in certain embodiments, GCNs may be used to model similar interactions in traffic networks and activity recognition. The input to a GCN network may include the spatial coordinates of all agents, denoted by $X \in \mathbb{R}^{n \times 2}$, where n represents the number of agents in the image, as well as the unweighted adjacency matrix, $A \in \mathbb{R}^{n \times n}$, of the agents, which may be defined as follows, $$A(i, j) = \begin{cases} e^{-d(v_i,v_j)} & \text{if } d(v_i, v_j) < \mu, \\ 0 & \text{otherwise.} \end{cases} \qquad (4)$$

As shown in (4), the function of $f=e^{-d(v_i v_j)}$ denotes the interactions between any two agents.

According to certain embodiments, the early fusion technique may be used to fuse the features from the three context streams to infer emotion, and the loss function may be used for training the multi-label classification problem. For instance, with context 1, an OpenFace method may be used to extract a 144-dimensional face modality vector, $m_1 \in \mathbb{R}^{25 \times 2}$ using OpenPose to extract 25 coordinates from the input image I. For each coordinate, x and y pixel values may be recorded.

In other embodiments, with context 2, a RobustTP method be used, which is a pedestrian tracking method to compute the bounding boxes for all agents in a scene. These bounding boxes may be used to compute $I_{mask}$ according to equation (2). With regard to context 3, a Megadepth method may be used to extract the depth maps from the input image I. In particular, the depth map, $I_{depth}$s, may be computed using equation (3).

According to certain embodiments, with regard to context 1, given a face vector, $m_1$, three 1D convolutions may be used (see top box of FIG. 3) with batch normalization and rectified linear unit (ReLU) non-linearity. This may be followed by a max pool operation and three fully-connected layers (see bottom box of FIG. 3) with batch normalization and ReLU. For $m_2$, the spatial temporal graph convolutional network (ST-GCN) architecture may be used, and the setup for 2D pose inputs may be modified for 25 joints. The different layers and hyper-parameters used are shown in FIG. 3. The two networks give $f_1$ and $f_2$, which may then be multiplicatively fused (see FIG. 3) to generate $h_1$.

In certain embodiments, with regard to context 2, for learning the semantic context of the input image I, the Attention Branch Network (ABN) on the masked image $I_{mask}$ may be used. ABN may include an attention branch that focuses on attention maps to recognize and localize important regions in an image. It may also output these potentially important locations in the form of $h_2$.

According to other embodiments, with regard to context 3, two experiments may be performed using both depth map and a GCN. For example, for a depth-based network, the depth map, $I_{depth}$, may be computed and passed through a CNN. The CNN may be composed of 5 alternating 2D convolutional layers (see FIG. 3) and max pooling layers (see FIG. 3). This may be followed by two fully connected layers of dimensions 1,000 and 26 (see FIG. 3). In certain embodiments, for the graph-based network, two graph convolutional layers may be used followed by two linear layers of dimension 100 and 26.

According to certain embodiments, the context interpretations may be fused. For instance, to fuse the feature vectors from the three context interpretations, an early fusion technique may be used. In this case, the feature vectors may be concatenated before making any individual emotion inferences: $h_{concat}=[h_1, h_2, h_3]$. According to certain embodiments, two fully connected layers of dimensions 56 and 26 may be used, followed by a softmax layer. This output may be used for computing the loss and the error, and then back-propagating the error back to the network.

Certain embodiments may compute the loss function. For example, the classification problem may be a multi-label classification problem where one or more than one emotion label may be assigned to an input image or video. To train this network, certain embodiments may use the multi-label soft margin loss function and denote it by $L_{classification}$. Additionally, the loss function may optimize a multi-label one-versus-all loss based on max-entropy between the input x and the output y. Thus, the two loss functions $L_{multiplicative}$ (from Eq. (1)) and $L_{classification}$ may be combined to train the context-aware emotion recognition model as shown in equation (5).

$$L_{total} = \lambda_1 L_{multiplicative} + \lambda_2 L_{classification} \quad (5)$$

Certain embodiments may utilize the EMOTIC dataset, which contains 23,571 images of 34,320 annotated people in unconstrained environments. The annotations may include the apparent emotional states of the people in the images. In addition, each person may be annotated for 26 discrete categories, with multiple labels assigned to each image.

Figure 8:
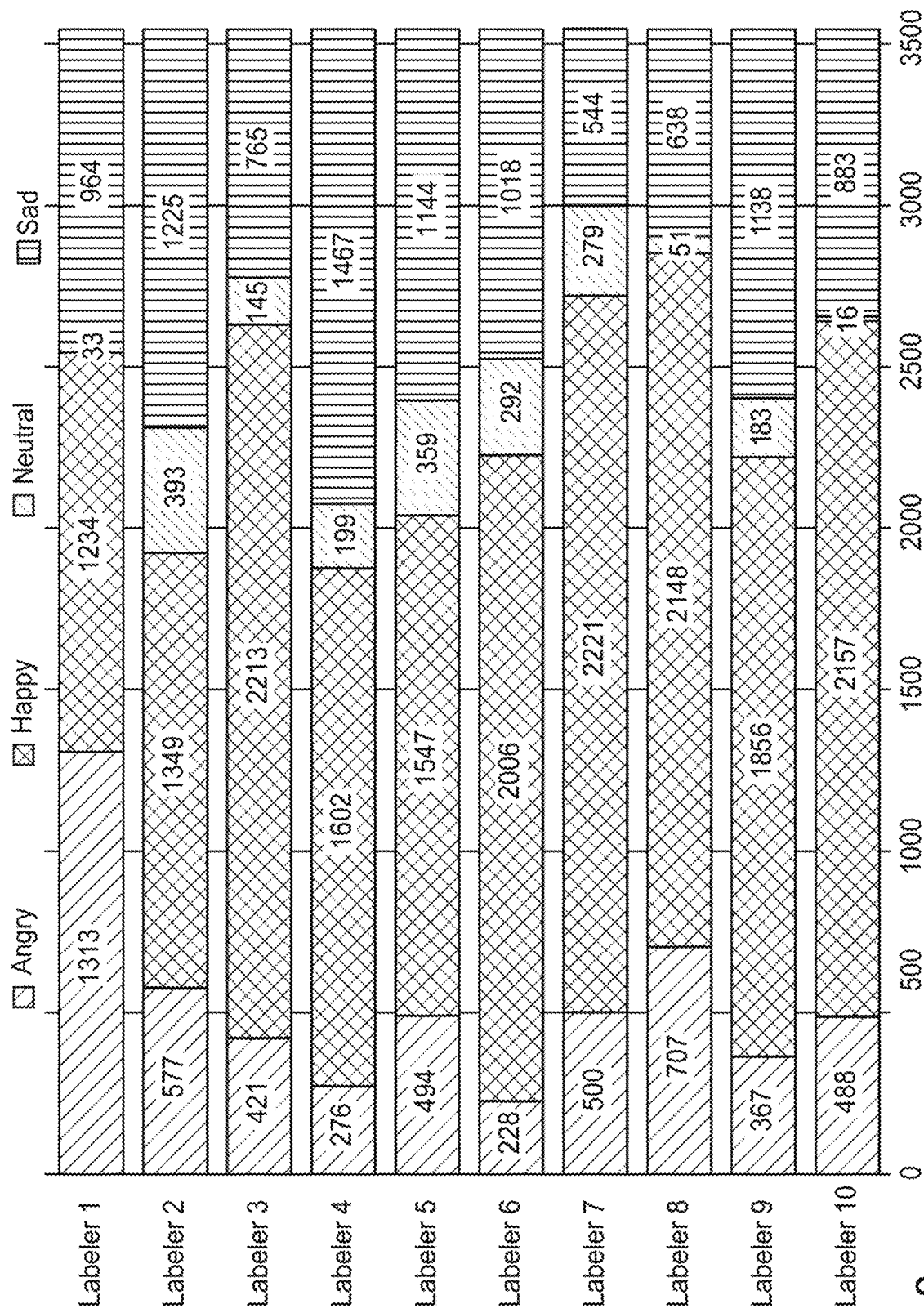
FIG. 8 illustrates an example distribution of emotion class labels added by annotators of the GroupWalk dataset, according to certain embodiments.

FIG. 8 illustrates an example distribution of emotion class labels added by annotators of the GroupWalk dataset, according to certain embodiments. With regard to annotation, the GroupWalk dataset may include 45 videos that were captured using stationary cameras in 8 real-world setting including a hospital entrance, an institutional building, a bus stop, a train station, and a marketplace, a tourist attraction, a shopping place and more. The annotators annotated agents with clearly visible faces and gaits across all videos. As illustrated in FIG. 8, 10 annotators annotated a total of 3,544 agents. In addition, the annotations consist of the following emotion labels—angry, happy, neutral, and sad. Efforts to build on this data are ongoing, and the dataset collected and annotated so far may be found at the project webpage. According to certain embodiments, to prepare to train and test splits for the dataset, 36 videos were randomly selected for the training, and 9 videos for testing. Additionally, the annotators were allowed to view the videos as many times as they wanted and had to categorize the emotion they perceived looking at the agent into 7 categories including: "somewhat happy", "extremely happy", "somewhat sad", "extremely sad", "somewhat angry", "extremely angry", and "neutral". In addition to perceived emotions, the annotators were asked to annotate the agents in terms of dominance (5 categories—"somewhat submissive", "extremely submissive", "somewhat dominant", "extremely dominant", and "neutral") and friendliness (5 categories—"somewhat friendly", "extremely friendly", "somewhat unfriendly", "extremely unfriendly", and "neutral").

Figure 9:
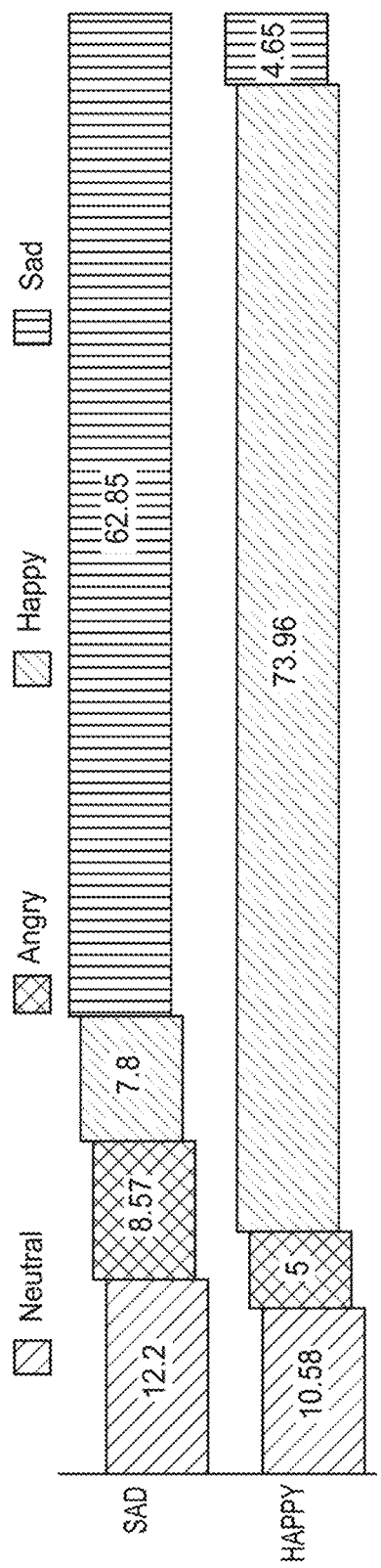
FIG. 9 illustrates an example annotator agreement/disagreement, according to certain embodiments.
Figure 10:
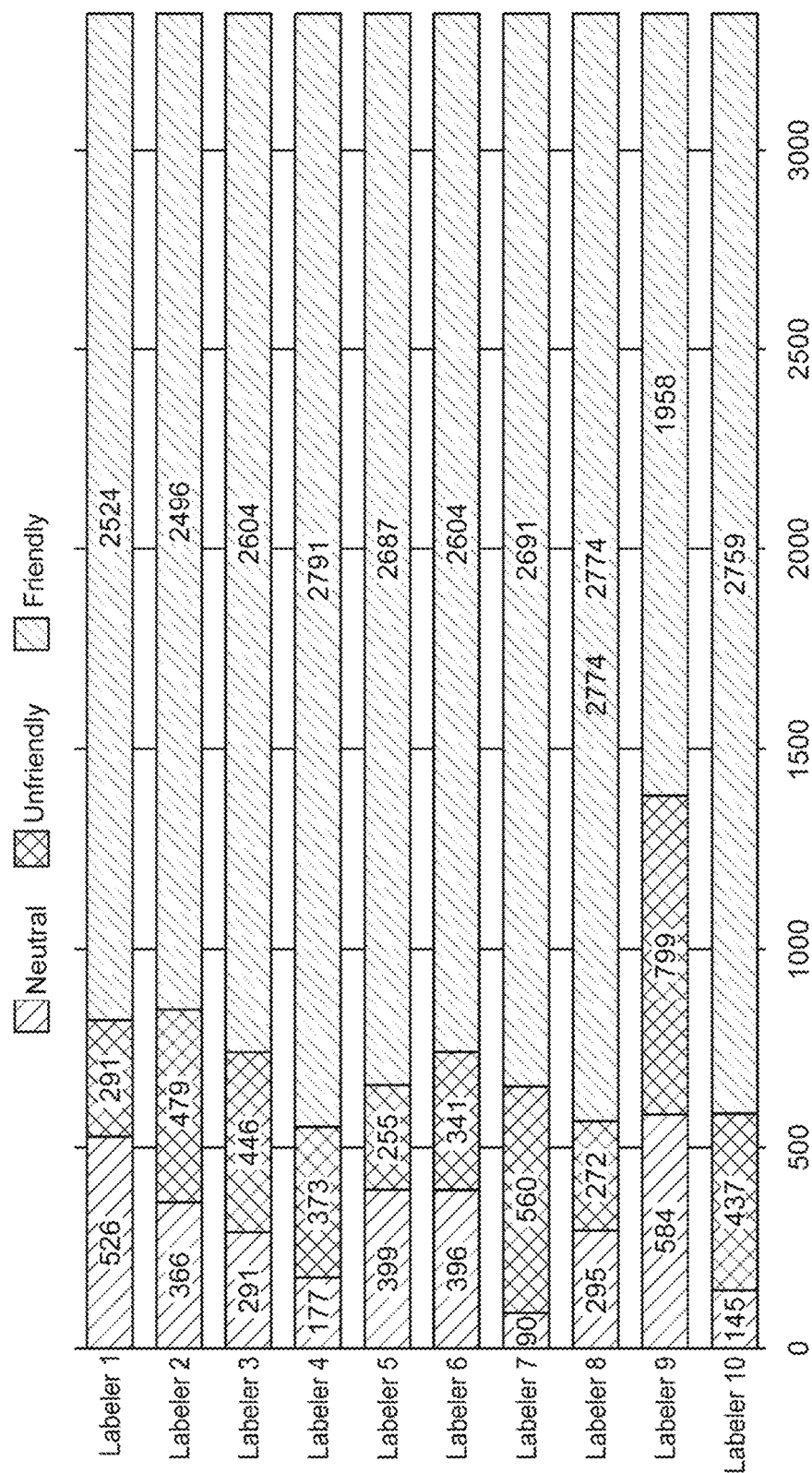
FIG. 10 illustrates an example of a friendliness labeler annotations, according to certain embodiments.
Figure 11:
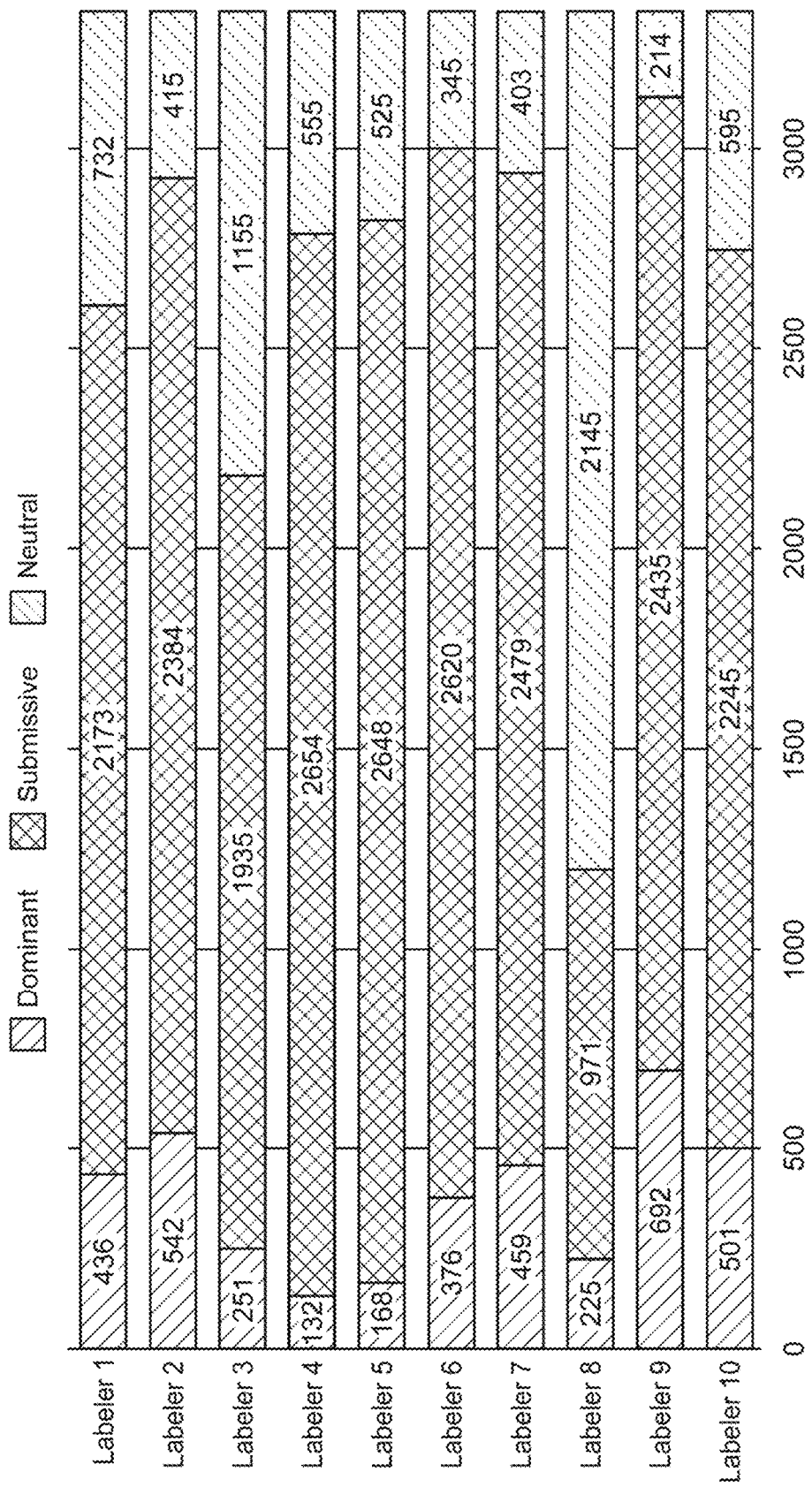
FIG. 11 illustrates an example of a dominance labeler annotations, according to certain embodiments.

FIG. 9 illustrates an example annotator agreement/disagreement, according to certain embodiments. In particular, FIG. 9 illustrates two emotion classes, happy and sad, and illustrates the trend of the annotator disagreement. Additionally, FIG. 10 illustrates an example of a friendliness labeler annotations, according to certain embodiments. Specifically, FIG. 10 illustrates the friendliness labels by 10 labelers, and a total of 3,341 agents were annotated from 45 videos. Further, FIG. 11 illustrates an example of a dominance labeler annotations, according to certain embodiments. In particular, FIG. 11 illustrates the dominance labels by 10 labelers, and a total of 3,341 agents were annotated from 45 videos.

In certain embodiments, while perceived emotions may be important, other affects such as dominance and friendliness may be important for carrying out joint and/or group tasks. Thus, in certain embodiments, each agent may be additionally labeled for dominance and friendliness.

According to certain embodiments, label processing may be conducted on the GroupWalk dataset. For instance, certain embodiments may consider 4 labels that may include angry, happy, neutral, and sad. As described above, it may be observed that the annotations are either "extreme" or "somewhat" variants of these labels (except neutral). Additionally, target labels may be generated for each agent. For example, each of the target labels may have a size of 1×4 with the 4 columns representing the 4 emotions being considered, and are initially all 0. In other embodiments, for a particular agent ID, if the annotation by annotator was an "extreme" variant of happy, sad, or angry, 2 may be added to the number in the column representing the corresponding major label. Otherwise, for all the other cases, 1 may be added to the number in the column representing the corresponding major label. Once the entire dataset has been gone through, the target label vector may be normalized so that the vector may be a combination of only 1s and 0s.

According to certain embodiments, for training the context aware emotion recognition model on the EMOTIC dataset, the standard train, validation (val), and test split ratios provided in the data set may be used. For GroupWalk, the dataset may be split into 85% training (85%) and testing (15%) sets. Further, in GroupWalk, each sample point may be an agent ID; hence the input may be all the frames for the agent in the video. In certain embodiments, to extend the model on videos, a forward pass may be performed for all the frames, and the average of the prediction vector across all the frames may be taken. With the average, the AP scores may be computed and used for loss calculation and back-propagating the loss. Additionally, a batch size of 32 for EMOTIC and a batch size of 1 for GroupWalk may be used. The model may then be trained for 75 epochs, and an Adam optimizer with a learning rate of 0.0001 may be used. The results were generated on a GPU, and the code was implemented using PyTorch.

According to certain embodiments, evaluation metrics and methods may be used. For instance, the standard metric AP may be used to evaluate the methods. For both EMOTIC and GroupWalk datasets, the methods of certain embodiments may be compared with various state of the art (SOTA) methods including, for example, Kosti, Zhang, and Lee. Kosti proposes a two-stream network followed by a fusion network. The first stream encodes context and then feeds the entire image as an input to the CNN. The second stream is a CNN for extracting body features. The fusion network combines features of the two CNNs, and estimates the discrete emotion categories.

Zhang builds an affective graph with nodes as the context elements extracted from the image. To detect the context elements, a Region Proposal Network (RPN) was used. This graph is fed into a GCN. Another parallel branch in the network encodes the body features using a CNN. Further, the outputs from both the branches are concatenated to infer an emotion label.

Lee presents a network architecture, CAER-Net consisting of two subnetworks, a two-stream encoding network, and an adaptive fusion network. The two-stream encoding network consists of a face stream and a context-stream where facial expression and context (background) are encoded. In addition, an adaptive fusion network is used to fuse the two streams. Certain embodiments may use the publicly available implementation for Kosti, and train the entire model on GroupWalk.

FIG. 4(a) illustrates a table of emotion classification performance of AP scores for the EMOTIC dataset, according to certain embodiments. Further, FIG. 4(b) illustrates a table of emotion classification performance of AP scores for the GroupWalk dataset, according to certain embodiments. In particular, FIGS. 4(a) and 4(b) illustrate that the context-aware emotion recognition model of certain embodiments outperforms all three methods for most of the classes and also overall. For the context-aware emotion recognition model, FIG. 4 illustrates the AP scores for both the GCN-based and the depth map-based implementations of context 3. On both the EMOTIC and GroupWalk datasets, the context-aware emotion recognition model outperformed the SOTA.

A factor for the success of the context-aware emotion recognition model includes its ability to combine different modalities effectively via multiplicative fusion. The approach of certain example embodiments may learn to assign higher weights to more expressive modalities while suppressing weaker ones.

Figure 5:
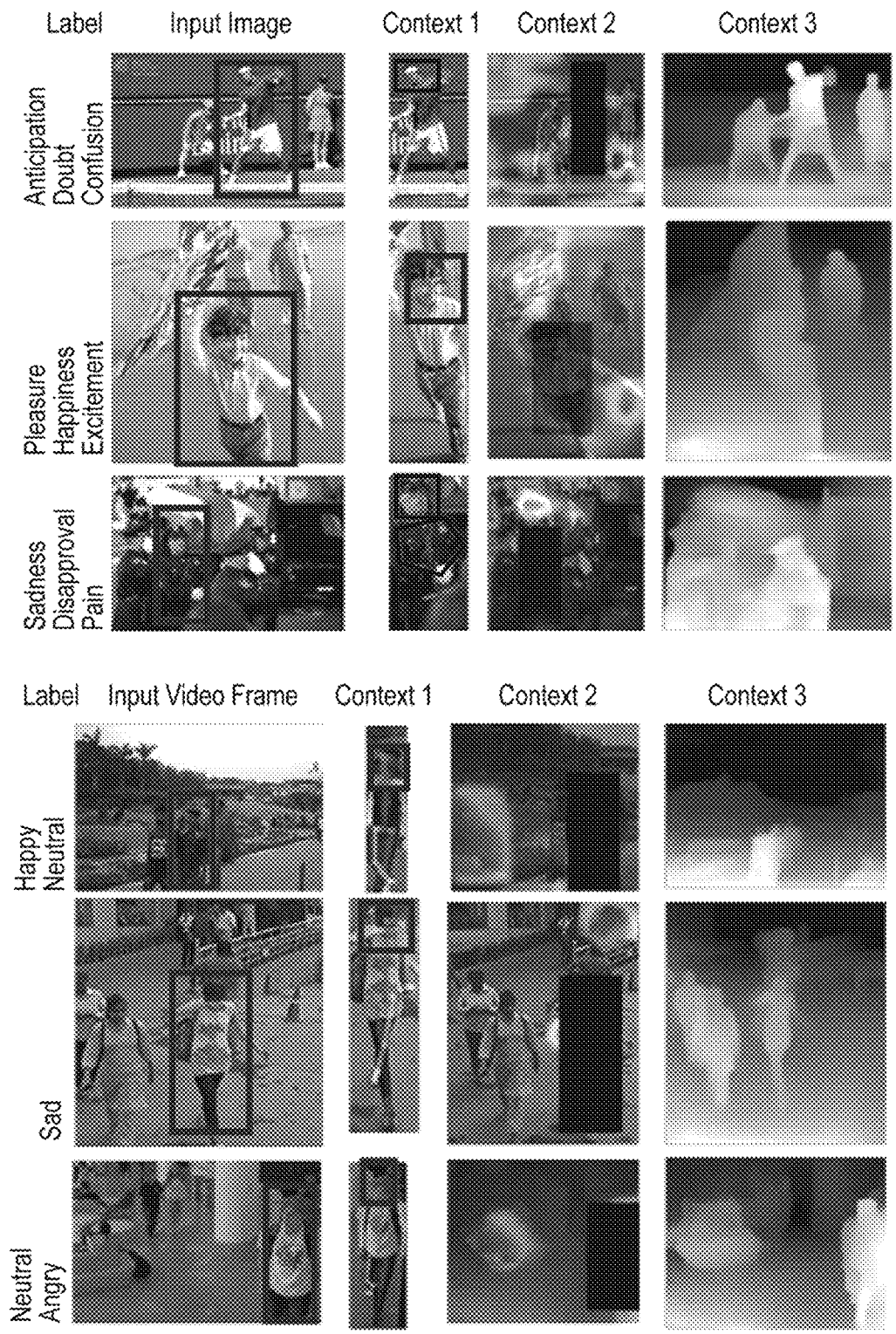
FIG. 5 illustrates classification qualitative results of the EMOTIC dataset and the GroupWalk dataset, according to certain embodiments.

FIG. 5 illustrates classification qualitative results of the EMOTIC dataset and the GroupWalk dataset, according to certain embodiments. In particular, FIG. 5 illustrates the classification results on three examples, each from the EMOTIC dataset (left) and GroupWalk (right), respectively. In the top row example (left) and middle row example (right), the depth map marks the tennis player about to swing to convey anticipation, and the woman coming from the hospital to convey sadness, respectively. In the bottom row (left) and bottom row (middle) examples, the semantic context of the coffin and the child's kite is identified to convey sadness and pleasure, respectively. As further illustrated in FIG. 5, the first column is the input image marking the primary agents, the second column shows the corresponding extracted face and gait, the third column shows the attention maps learned by the model, and the fourth column shows the depth map extracted from the input image. The heat maps in the attention maps indicate what the network has learned.

In contrast to Lee, which relies on the availability of face data, in instances where the face may not be visible, the context-aware emotion recognition model may infer the emotion from the context (see FIG. 5, middle row (right)). Consequently, Lee performs poorly on both the EMOTIC and GroupWalk datasets as both datasets contain examples where the face is not clearly visible.

To further demonstrate the ability of the context-aware emotion recognition model to generalize to any modality, FIG. 12 illustrates a table of IEMOCAP experiments, according to certain embodiments. In particular, FIG. 12 illustrates mean classification accuracies for the IEMOCAP dataset. Here, the IEMOCAP dataset includes speech, text, and face modalities of 10 actors recorded in the form of conversations (both spontaneous and scripted) using a motion capture camera. The labeled annotations consist of 4 emotions—angry, happy, neutral, and sad. This is a single-label classification as opposed to a multi-label classification reported for EMOTIC and GroupWalk. Thus, the mean classification accuracies are reported rather than the AP scores, as shown in FIG. 12.

As can be seen from the table in FIG. 12, there is not a significant improvement in the accuracy, 84.5% as SOTA works, not essentially based on context have reported an accuracy of 82.7%. The controlled settings in which the dataset was collected, with minimal context information results in minimal improvements. Moreover, previous methods in Kosti and Lee do not have any context to learn from, and therefore do not perform well.

According to certain embodiments, for GCN versus depth maps, the GCN-based methods did not perform as well as depth-based maps. This may be due to the fact that on average, most images of the EMOTIC dataset contain 5 agents. Certain GCN-based methods may be trained on datasets with more number of agents in each image or video. Moreover, with a depth-based approach, the context-aware emotion recognition model may lean a 3D aspect of the scene in general, and may not be limited to inter-agent interactions.

FIG. 6 illustrates misclassification by the context-aware emotion recognition model, according to certain embodiments. In particular, FIG. 6 illustrates two examples where the context-aware emotion recognition model incorrectly classified the labels. In the first examples, the context-aware emotion recognition model was confused about the prediction due to the lack of any context. In the second example, there was a lot of context available, which also became confusing. Additionally, FIG. 6 illustrates the ground-truth and predicted emotion labels. In the first image, the context-aware emotion recognition model was unable to gather any context information. On the other hand, in the second image, there was a lot of context information such as the many visual elements in the image and multiple agents. As such, this lead to an incorrect inference of the perceived emotion.

In certain embodiments, the context-aware emotion recognition model may be run on both EMOTIC and Group-Walk datasets, removing the networks corresponding to both contexts, followed by removing either of them one by one. The results of the ablation experiments are summarized in the tables shown in FIGS. 7(a) and 7(b). In particular, FIG. 7(a) illustrates a table of ablation experiments on the EMOTIC dataset, according to certain embodiments. Further, FIG. 7(b) illustrates a table of ablation experiments on the GroupWalk dataset, according to certain embodiments. As illustrated in FIGS. 7(a) and 7(b), context 1 was retained in all the runs since only context 1 captured information from the agent itself. Additionally, from columns 2 and 3 in FIGS. 7(a) and 7(b), it can be observed that the qualitative results from FIG. 5 that context 2 seems to be more expressive in the images of the EMOTIC dataset, while context 3 is more representative in the GroupWalk dataset. In particular, the EMOTIC dataset was collected for the task of emotion recognition with context. The EMOTIC dataset is a dataset of pictures collected from multiple datasets and scraped from the Internet. As a result, most of the images have a rich background context. Moreover, it was observed that more than half the images of EMOTIC contain at most 3 people. As such, according to certain embodiments, context 2 was more expressive in the images of the EMOTIC dataset, while context 3 was more representative in the GroupWalk dataset where the number of people per frame was much higher. This density may be captured best in context 3, helping the network to make better inferences.

Figure 13:
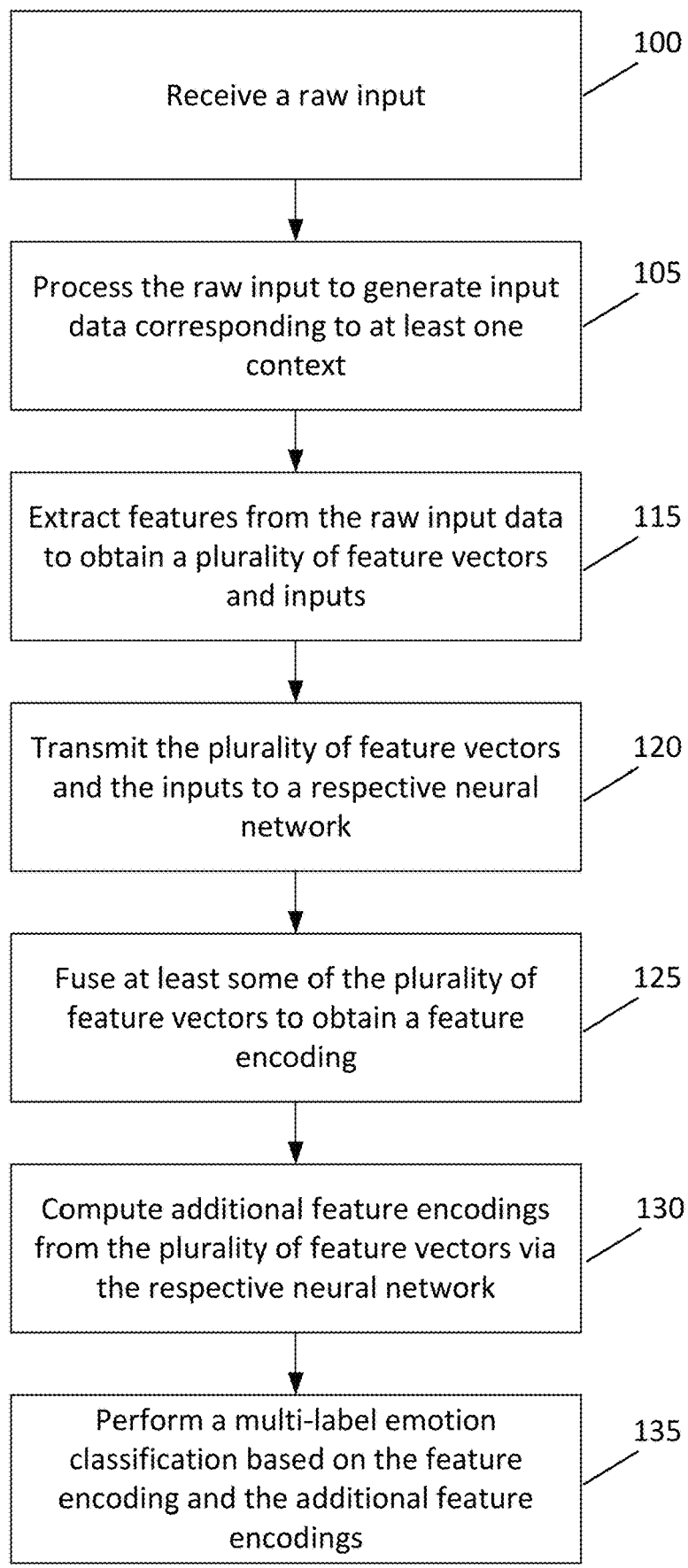
FIG. 13 illustrates an example flow diagram of a method, according to certain embodiments.

FIG. 13 illustrates an example flow diagram of a method, according to certain example embodiments. In certain example embodiments, the flow diagram of FIG. 13 may be performed by a system that includes a computer apparatus, computer system, network, neural network, apparatus, or other similar device(s). According to certain embodiments, each of these apparatuses of the system may be represented by, for example, an apparatus similar to apparatus 10 illustrated in FIG. 14.

According to one example embodiment, the method of FIG. 13 may include a method for recognizing perceived human emotion. In particular, the method may include, at 100, receiving a raw input. At 105, the method may include processing the raw input to generate input data corresponding to at least one context. At 110, the method may also include extracting features from the raw input data to obtain a plurality of feature vectors and inputs. At 115, the method may further include transmitting the plurality of feature vectors and the inputs to a respective neural network. In addition, at 120, the method may include fusing at least some of the plurality of feature vectors to obtain a feature encoding. Further, at 125, the method may include computing additional feature encodings from the plurality of feature vectors via the respective neural network. At 130, the method may include performing a multi-label emotion classification of a primary agent in the raw input based on the feature encoding and the additional feature encodings.

According to certain embodiments, performing the multi-label emotion classification may include concatenating the feature encoding and the additional feature encodings. According to some embodiments, the at least one context may include a first context of a plurality of modalities, a second context of background content, and a third context of socio-dynamic inter-agent interactions. According to other embodiments, the input data may include a plurality of modalities, and the plurality of modalities may include facial expressions, voice, text, body posture, gaits, or physiological signals.

In certain embodiments, the method may also include processing the plurality of modalities via a plurality of 1D convolutional networks with batch normalization and a rectified linear activation function non-linearity, or a spatial temporal graph convolutional network. In some embodiments, one of the additional feature encodings may be computed by learning semantic context of the raw input to recognize and localize specific regions of the raw input. In other embodiments, the additional feature encodings may be computed by computing a mask of the raw input by implementing an attenuation mechanism to focus on different aspects of the raw input while masking the primary agent of the raw input, computing a depth map of the raw input, and feeding the depth map through a convolutional neural network comprising a plurality of alternating 2D convolutional layers to learn about a proximity of a plurality of agents to each other in the raw input.

Figure 14:
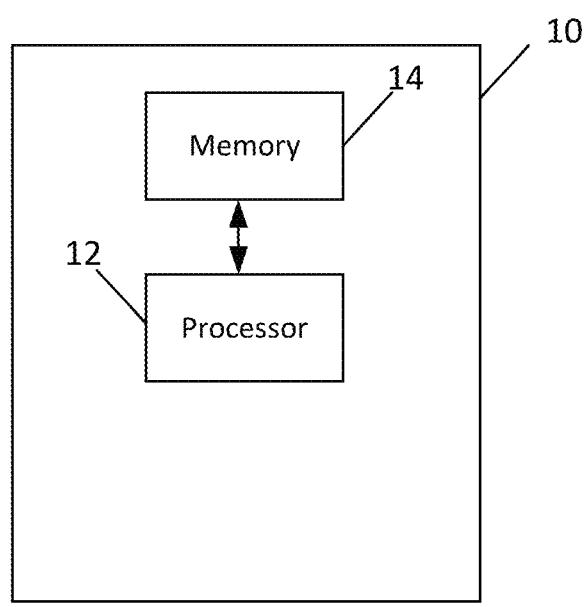
FIG. 14 illustrates an apparatus, according to certain embodiments.

FIG. 14 illustrates an apparatus 10 according to an example embodiment. Although only one apparatus is illustrated in FIG. 14, the apparatus may represent multiple apparatus as part of a system or network. For example, in certain embodiments, apparatus 10 may be an ECG apparatus, PPG apparatus, or computer apparatus that operate individually or together as a system.

In some embodiments, the functionality of any of the methods, processes, algorithms or flow charts described herein may be implemented by software and/or computer program code or portions of code stored in memory or other computer readable or tangible media, and executed by a processor.

For example, in some embodiments, apparatus 10 may include one or more processors, one or more computer-readable storage medium (for example, memory, storage, or the like), one or more radio access components (for example, a modem, a transceiver, or the like), and/or a user interface. It should be noted that one of ordinary skill in the art would understand that apparatus 10 may include components or features not shown in FIG. 14.

As illustrated in the example of FIG. 14, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 14, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-13.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-13.

Additionally or alternatively, in some embodiments, apparatus 10 may include an input and/or output device (I/O device). In certain embodiments, apparatus 10 may further include a user interface, such as a graphical user interface or touchscreen.

In certain embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, processor 12 and memory 14 may be included in or may form a part of processing circuitry or control circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware.

According to certain embodiments, apparatus 10 may be controlled by memory 14 and processor 12 to perform functions associated with example embodiments described herein. For instance, in certain embodiments, apparatus 10 may be controlled by memory 14 and processor 12 to receive a raw input. Apparatus 10 may also be controlled by memory 14 and processor 12 to process the raw input to generate input data corresponding to at least one context. Apparatus 10 may further be controlled by memory 14 and processor 12 to extract features from the raw input data to obtain a plurality of feature vectors and inputs. In addition, apparatus 10 may be controlled by memory 14 and processor 12 to transmit the plurality of feature vectors and the inputs to a respective neural network. Further, apparatus 10 may be controlled by memory 14 and processor 12 to fuse at least some of the plurality of feature vectors to obtain a feature encoding. Apparatus 10 may also be controlled by memory 14 and processor 12 to compute additional feature encodings from the plurality of feature vectors via the respective neural network. Apparatus 10 may further be controlled by memory 14 and processor 12 to perform a multi-label emotion classification based on the feature encoding and the additional feature encodings.

Certain example embodiments may be directed to an apparatus that includes means for receiving a raw input. The apparatus may also include means for processing the raw input to generate input data corresponding to at least one context. The apparatus may further include means for extracting features from the raw input data to obtain a plurality of feature vectors and inputs. In addition, the apparatus may include means for transmitting the plurality of feature vectors and the inputs to a respective neural network. Further, the apparatus may include means for fusing at least some of the plurality of feature vectors to obtain a feature encoding. The apparatus may also include means for computing additional feature encodings from the plurality of feature vectors via the respective neural network. The apparatus may further include means for performing a multi-label emotion classification of a primary agent in the raw input based on the feature encoding and the additional feature encodings.

Certain embodiments described herein provide several technical improvements, enhancements, and/or advantages. In some embodiments, it may be possible to provide a context-aware emotion recognition model that borrows and incorporates the context interpretations from psychology. In particular, certain embodiments may use multiple modalities (e.g., faces and gaits), situational context, and socio-dynamic context information. The modalities are easily available, and can be easily captured or extracted using commodity hardware (e.g., cameras). It may also be possible to achieve improved AP scores on EMOTIC and GroupWalk dataset. For instance, with the EMOTIC dataset, an improved AP score of 35.48 was achieved, which was an improvement of 7-8% over conventional methods.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

| Partial Glossary: | |
|---|---|
| AP | Average Precision |
| CAER | Context-Aware Emotion Recognition |
| CNN | Convolutional Neural Network |
| EMOTIC | Emoticons in Context |
| GCN | Graph Convolutional Networks |
| IEMOCAP | Interactive emotional dyadic motion capture |
| RPN | Region Proposal Network |

We claim:

1. A method for recognizing perceived human emotion, comprising:
receiving a raw input;
processing the raw input to generate input data corresponding to at least one context;
extracting features from the raw input data to obtain a plurality of feature vectors and inputs;
transmitting the plurality of feature vectors and the inputs to a respective neural network;
fusing at least some of the plurality of feature vectors to obtain a feature encoding;
computing additional feature encodings from the plurality of feature vectors via the respective neural network based, at least in part, on feeding a depth map computed from the raw input through a convolutional neural network comprising a plurality of alternating 2D convolutional layers to learn about a proximity of a plurality of agents to each other in the raw input; and
performing a multi-label emotion classification of a primary agent in the raw input based on the feature encoding and the additional feature encodings.

2. The method for recognizing perceived human emotion according to claim 1, wherein performing the multi-label emotion classification comprises concatenating the feature encoding and the additional feature encodings.

3. The method for recognizing perceived human emotion according to claim 1, wherein the at least one context comprises:
a first context of a plurality of modalities,
a second context of background content, and
a third context of socio-dynamic inter-agent interactions.

4. The method for recognizing perceived human emotion according to claim 1,
wherein the input data comprises a plurality of modalities, and
wherein the plurality of modalities comprise facial expressions, voice, text, body posture, gaits, or physiological signals.

5. The method for recognizing perceived human emotion according to claim 4, further comprising:
processing the plurality of modalities via
a plurality of 1D convolutional networks with batch normalization and a rectified linear activation function non-linearity (to calculate m1), or
a spatial temporal graph convolutional network (ST-GCN).

6. The method for recognizing perceived human emotion according to claim 1, wherein one of the additional feature encodings is computed by:
learning semantic context of the raw input to recognize and localize specific regions of the raw input.

7. The method for recognizing perceived human emotion according to claim 1, wherein the additional feature encodings are further computed by:
computing a mask of the raw input by implementing an attenuation mechanism to focus on different aspects of the raw input while masking the primary agent of the raw input.

8. An apparatus, comprising:
at least one processor; and
at least one memory comprising computer program code,
the at least one memory and the computer program code are configured, with the at least one processor, to cause the apparatus at least to
receive a raw input;
process the raw input to generate input data corresponding to at least one context;
extract features from the raw input data to obtain a plurality of feature vectors and inputs;
transmit the plurality of feature vectors and the inputs to a respective neural network;
fuse at least some of the plurality of feature vectors to obtain a feature encoding;
compute additional feature encodings from the plurality of feature vectors via the respective neural network based, at least in part, on feeding a depth map computed from the raw input through a convolutional neural network comprising a plurality of alternating 2D convolutional layers to learn about a proximity of a plurality of agents to each other in the raw input; and
perform a multi-label emotion classification based on the feature encoding and the additional feature encodings.

9. The apparatus according to claim 8, wherein performing the multi-label emotion classification comprises concatenating the feature encoding and the additional feature encodings.

10. The apparatus according to claim 8, wherein the at least one context comprises:
a first context of a plurality of modalities,
a second context of background content, and
a third context of socio-dynamic inter-agent interactions.

11. The apparatus according to claim 8,
wherein the input data comprises a plurality of modalities, and
wherein the plurality of modalities comprise facial expressions, voice, text, body posture, gaits, or physiological signals.

12. The apparatus according to claim 11, wherein the at least one memory and the computer program code are further configured, with the at least one processor, to cause the apparatus at least to:
process the plurality of modalities via
a plurality of 1D convolutional networks with batch normalization and a rectified linear activation function non-linearity, or
a spatial temporal graph convolutional network.

13. The apparatus according to claim 8, wherein one of the additional feature encodings is computed by:
the at least one memory and the computer program code being configured, with the at least one processor, to cause the apparatus at least to learn semantic context of the raw input to recognize and localize specific regions of the raw input.

14. The apparatus according to claim 8, wherein the additional feature encodings are computed by the at least one memory and the computer program code being configured, with the at least one processor, to further cause the apparatus at least to:

compute a mask of the raw input by implementing an attenuation mechanism to focus on different aspects of the raw input while masking a primary agent of the raw input.

15. A computer program embodied on a non-transitory computer readable medium, said computer program comprising computer executable code which, when executed by a processor, causes the processor to:

receive a raw input;
process the raw input to generate input data corresponding to at least one context;
extract features from the raw input data to obtain a plurality of feature vectors and inputs;
transmit the plurality of feature vectors and the inputs to a respective neural network;
fuse at least some of the plurality of feature vectors to obtain a feature encoding;
compute additional feature encodings from the plurality of feature vectors via the respective neural network based, at least in part, on feeding a depth map computed from the raw input through a convolutional neural network comprising a plurality of alternating 2D convolutional layers to learn about a proximity of a plurality of agents to each other in the raw input; and
perform a multi-label emotion classification based on the feature encoding and the additional feature encodings.

16. The computer program according to claim 15, wherein when performing the multi-label emotion classification, the processor is further caused to concatenate the feature encoding and the additional feature encodings.

17. The computer program according to claim 15, wherein the at least one context comprises:
a first context of a plurality of modalities,
a second context of background content, and
a third context of socio-dynamic inter-agent interactions.

18. The computer program according to claim 15, wherein the input data comprises a plurality of modalities, and
wherein the plurality of modalities comprise facial expressions, voice, text, body posture, gaits, or physiological signals.

19. The computer program according to claim 18, wherein the processor is further caused to:
process the plurality of modalities via
a plurality of 1D convolutional networks with batch normalization and a rectified linear activation function non-linearity, or
a spatial temporal graph convolutional network.

20. The computer program according to claim 15, wherein one of the additional feature encodings is computed by the processor being caused to:
learn semantic context of the raw input to recognize and localize specific regions of the raw input.

21. The computer program according to claim 15, wherein the additional feature encodings are further computed by the processor being caused to:
compute a mask of the raw input by implementing an attenuation mechanism to focus on different aspects of the raw input while masking a primary agent of the raw input.

\* \* \* \* \*